(12) United States Patent
Kuroda et al.

(10) Patent No.: US 7,440,338 B2
(45) Date of Patent: Oct. 21, 2008

(54) MEMORY CONTROL CIRCUIT AND MEMORY CONTROL METHOD

(75) Inventors: Takashi Kuroda, Gunma (JP); Iwao Honda, Gunma (JP); Noriyuki Tomita, Ota (JP); Hideki Ohashi, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 97 days.

(21) Appl. No.: 11/614,793

(22) Filed: Dec. 21, 2006

(65) Prior Publication Data

US 2007/0147137 A1 Jun. 28, 2007

(30) Foreign Application Priority Data

Dec. 22, 2005 (JP) .............................. 2005-369848

(51) Int. Cl.
*G11C 7/10* (2006.01)
(52) U.S. Cl. ................. 365/189.04; 365/238.5
(58) Field of Classification Search ............ 365/189.04, 365/238.05, 189.08
See application file for complete search history.

(56) References Cited

U.S. PATENT DOCUMENTS

| 6,721,212 B2 * | 4/2004 | Sasaki ............... 365/189.11 |
| 7,184,322 B2 * | 2/2007 | Takahashi et al. ...... 365/189.02 |
| 2007/0153576 A1 * | 7/2007 | Oh et al. ............ 365/185.11 |

FOREIGN PATENT DOCUMENTS

JP 06-266614 9/1994

* cited by examiner

*Primary Examiner*—Anh Phung
(74) *Attorney, Agent, or Firm*—SoCal Ip Law Group LLP; Steven C. Sereboff; John E. Gunther

(57) ABSTRACT

A memory control circuit that controls m (=L/k) memories (first to mth memories), each of which has a k-bit width, the m memories storing data having a data width (D bits) of an integral multiple of k bits up to L bits, the circuit comprising: an address input circuit that determines a memory (nth memory) storing a first k bits of the data among the m memories, based on a start-position specification address which is a predetermined j bits of an A-bit address indicating a storage destination of the data, and inputs to the nth to mth memories a first specification address for specifying a storage destination of the data, the first specification address being an A-j bits of the A-bit address, which is the A-bit address without the predetermined j bits thereof, and inputs to the first to (n−1)th memories a second specification address obtained by adding one to the first specification address; a data input circuit that inputs a plurality of pieces of divided data obtained by dividing the data into k-bit data to the memories respectively, in the order of the nth to mth memories and the first to (n−1)th memories, based on the start-position specification address; a data output circuit that reads the plurality of pieces of divided data from the memories respectively, in the order of the nth to mth memories and the first to (n−1)th memories, the number of the memories corresponding to the data width of the data, and outputs the read plurality of pieces of divided data as the data, based on the start-position specification address; and a memory selecting circuit that makes the D/k memories readable/writable, in the order of the nth to mth memories and the first to (n−1)th memories, based on the start-position specification address and the data width of the data.

7 Claims, 21 Drawing Sheets

| TRUTH TABLE OF SELECTOR S0 | | | | | | | | |
|---|---|---|---|---|---|---|---|---|
| INPUT | OUTPUT | | | | | | | |
| SEL | Y0 | Y1 | Y2 | Y3 | ... | Ym-4 | Ym-3 | Ym-2 |
| 0 | A | A | A | A | ... | A | A | A |
| 1 | B | A | A | A | ... | A | A | A |
| 2 | B | B | A | A | ... | A | A | A |
| 3 | B | B | B | A | ... | A | A | A |
| 4 | B | B | B | B | ... | A | A | A |
| 5 | B | B | B | B | ... | A | A | A |
| ⋮ | ⋮ | ⋮ | ⋮ | ⋮ | ⋮ | ⋮ | ⋮ | ⋮ |
| m-3 | B | B | B | B | ... | B | A | A |
| m-2 | B | B | B | B | ... | B | B | A |
| m-1 | B | B | B | B | ... | B | B | B |

FIG. 3

| TRUTH TABLE OF DECODER 12 | | | | | | | |
|---|---|---|---|---|---|---|---|
| INPUT | OUTPUT | | | | | | |
| IN | Y1 | Y2 | Y3 | Y4 | ... | Ym-2 | Ym-1 |
| 0 | 0 | 0 | 0 | 0 | ... | 0 | 0 |
| 1 | 1 | 0 | 0 | 0 | ... | 0 | 0 |
| 2 | 1 | 1 | 0 | 0 | ... | 0 | 0 |
| 3 | 1 | 1 | 1 | 0 | ... | 0 | 0 |
| 4 | 1 | 1 | 1 | 1 | ... | 0 | 0 |
| 5 | 1 | 1 | 1 | 1 | ... | 0 | 0 |
| ⋮ | ⋮ | ⋮ | ⋮ | ⋮ | ⋮ | ⋮ | ⋮ |
| m-3 | 1 | 1 | 1 | 1 | ... | 0 | 0 |
| m-2 | 1 | 1 | 1 | 1 | ... | 1 | 0 |
| m-1 | 1 | 1 | 1 | 1 | ... | 1 | 1 |

FIG. 4

| TRUTH TABLE OF SELECTORS S1 TO S3 | | | | | | | | | |
|---|---|---|---|---|---|---|---|---|---|
| INPUT | OUTPUT | | | | | | | | |
| SEL | Y0 | Y1 | Y2 | Y3 | ... | Ym-4 | Ym-3 | Ym-2 | Ym-1 |
| 0 | IN0 | IN1 | IN2 | IN3 | ... | INm-4 | INm-3 | INm-2 | INm-1 |
| 1 | INm-1 | IN0 | IN1 | IN2 | ... | INm-5 | INm-4 | INm-3 | INm-2 |
| 2 | INm-2 | INm-1 | IN0 | IN1 | ... | INm-6 | INm-5 | INm-4 | INm-3 |
| 3 | INm-3 | INm-2 | INm-1 | IN0 | ... | INm-7 | INm-6 | INm-5 | INm-4 |
| 4 | INm-4 | INm-3 | INm-2 | INm-1 | ... | INm-8 | INm-7 | INm-6 | INm-5 |
| 5 | INm-5 | INm-4 | INm-3 | INm-2 | ... | INm-9 | INm-8 | INm-7 | INm-6 |
| ⋮ | ⋮ | ⋮ | ⋮ | ⋮ | ⋮ | ⋮ | ⋮ | ⋮ | ⋮ |
| m-3 | IN3 | IN4 | IN5 | IN6 | ... | INm-1 | IN0 | IN1 | IN2 |
| m-2 | IN2 | IN3 | IN4 | IN5 | ... | INm-2 | INm-1 | IN0 | IN1 |
| m-1 | IN1 | IN2 | IN3 | IN4 | ... | INm-3 | INm-2 | INm-1 | IN0 |

FIG. 5

| TRUTH TABLE OF DECODER 31 | | | |
|---|---|---|---|
| INPUT | OUTPUT | | |
| IN | Y0 | Y1 | Y2 |
| 0 | 0 | 0 | 0 |
| 1 | 1 | 0 | 0 |
| 2 | 1 | 1 | 0 |
| 3 | 1 | 1 | 1 |

FIG. 7

| RELATIONSHIP BETWEEN WD_LENGTH AND DATA WIDTH | |
|---|---|
| WD_LENGTH | DATA WIDTH |
| 0 | 8 BITS |
| 1 | 16 BITS |
| 2 | 24 BITS |
| 3 | 32 BITS |

FIG. 8

| TRUTH TABLE OF DECODER 12 | | | |
|---|---|---|---|
| INPUT | OUTPUT | | |
| IN | Y1 | Y2 | Y3 |
| 0 | 0 | 0 | 0 |
| 1 | 1 | 0 | 0 |
| 2 | 1 | 1 | 0 |
| 3 | 1 | 1 | 1 |

FIG. 9

| TRUTH TABLE OF SELECTOR S1 | | | | |
|---|---|---|---|---|
| INPUT | OUTPUT | | | |
| SEL | $\overline{Y0}$ | $\overline{Y1}$ | $\overline{Y2}$ | $\overline{Y3}$ |
| 0 | $\overline{IN0}$ | $\overline{IN1}$ | $\overline{IN2}$ | $\overline{IN3}$ |
| 1 | $\overline{IN3}$ | $\overline{IN0}$ | $\overline{IN1}$ | $\overline{IN2}$ |
| 2 | $\overline{IN2}$ | $\overline{IN3}$ | $\overline{IN0}$ | $\overline{IN1}$ |
| 3 | $\overline{IN1}$ | $\overline{IN2}$ | $\overline{IN3}$ | $\overline{IN0}$ |

FIG. 10

| TRUTH TABLE OF SELECTORS S2a TO S2d ||||| 
|---|---|---|---|---|
| INPUT | OUTPUT ||||
| SEL | R31-24 | R23-16 | R15-8 | R7-0 |
| 0 | MEMORY0 | MEMORY1 | MEMORY2 | MEMORY3 |
| 1 | MEMORY1 | MEMORY2 | MEMORY3 | MEMORY0 |
| 2 | MEMORY2 | MEMORY3 | MEMORY0 | MEMORY1 |
| 3 | MEMORY3 | MEMORY0 | MEMORY1 | MEMORY2 |

FIG. 11

| TRUTH TABLE OF SELECTORS S3a TO S3d |||||
|---|---|---|---|---|
| INPUT | OUTPUT ||||
| SEL | W31-24 | W23-16 | W15-8 | W7-0 |
| 0 | [31:24] | [23:16] | [15:8] | [7:0] |
| 1 | [7:0] | [31:24] | [23:16] | [15:8] |
| 2 | [15:8] | [7:0] | [31:24] | [23:16] |
| 3 | [23:16] | [15:8] | [7:0] | [31:24] |

FIG. 12

| NO. 0 | 0-A | 0-B | 0-C | 0-D |
| NO. 1 | 1-A | 1-B | | |
| NO. 2 | 2-A | 2-B | 2-C | |
| NO. 3 | 3-A | 3-B | 3-C | 3-D |
| NO. 4 | 4-A | 4-B | 4-C | |
| NO. 5 | 5-A | | | |
| NO. 6 | 6-A | 6-B | 6-C | 6-D |
| NO. 7 | 7-A | 7-B | 7-C | |
| NO. 8 | 8-A | 8-B | 8-C | 8-D |
| NO. 9 | 9-A | 9-B | | |

INVALID DATA AREA

| | | | | |
|---|---|---|---|---|
| NO. 0 | 0-A | 0-B | 0-C | 0-D |
| NO. 1 | 1-A | 1-B | 2-A | 2-B |
| NO. 2 | 2-C | 3-A | 3-B | 3-C |
| NO. 3 | 3-D | 4-A | 4-B | 4-C |
| NO. 4 | 5-A | 6-A | 6-B | 6-C |
| NO. 5 | 6-D | 7-A | 7-B | 7-C |
| NO. 6 | 8-A | 8-B | 8-C | 8-D |
| NO. 7 | 9-A | 9-B | | |

FIG. 24

MEMORY CONTROL CIRCUIT AND MEMORY CONTROL METHOD

CROSS-REFERENCE TO RELATED APPLICATION

This application claims the benefit of priority to Japanese Patent Application No. 2005-369848, filed Dec. 22, 2005, of which full contents are incorporated herein by reference.

BACKGROUND OF THE INVENTION

1. Technical Field

The present invention relates to a memory control circuit and a memory control method.

2. Description of the Related Art

FIG. 21 depicts a configuration of a typical memory. A memory 50 can read and write up to L bits of data specified by an A-bit address. Two methods are conceivable to store various data with different data widths as shown in FIG. 22 into the memory 50.

In one method, as shown in FIG. 23, each piece of data is stored at one address (see, e.g., Japanese Patent Application Laid-Open Publication No. 1994-266614). In the other method, as shown in FIG. 24, a plurality of data with different data widths is packed into the memory 50.

However, if the method shown in FIG. 23 is used, when storing data with a data width less than L bits, an unused data area (invalid data area) is generated, which deteriorates the usage efficiency of the memory. If the method shown in FIG. 24 is used, although the invalid data area is not generated and the usage efficiency of the memory 50 is improved, processes of packing and unpacking data are needed before writing data into the memory 50 and after reading data from the memory 50, which increases a processing load.

SUMMARY OF THE INVENTION

The present invention was conceived in view of the above situations and it is therefore the object of the present invention to provide a memory control circuit and a memory control method that enable reading and writing of various data with different data widths without causing deterioration of usage efficiency of a memory and increase of a processing load.

In order to achieve the above object, according to a major aspect of the present invention there is provided a memory control circuit that controls m (=L/k) memories (first to mth memories), each of which has a k-bit width, the m memories storing data having a data width (D bits) of an integral multiple of k bits up to L bits, the circuit comprising: an address input circuit that determines a memory (nth memory) storing the first k bits of the data among the m memories, based on a start-position specification address which is a predetermined j bits of an A-bit address indicating a storage destination of the data, and inputs to the nth to mth memories a first specification address for specifying a storage destination of the data, the first specification address being an A−j bits of the A-bit address, which is the A-bit address without the predetermined j bits thereof, and inputs to the first to (n−1)th memories a second specification address obtained by adding one to the first specification address; a data input circuit that inputs a plurality of pieces of divided data obtained by dividing the data into k-bit data to the memories respectively, in the order of the nth to mth memories and the first to (n−1)th memories, based on the start-position specification address; a data output circuit that reads the plurality of pieces of divided data from the memories respectively, in the order of the nth to mth memories and the first to (n−1)th memories, the number of the memories corresponding to the data width of the data, and outputs the read plurality of pieces of divided data as the data, based on the start-position specification address; and a memory selecting circuit that makes the D/k memories readable/writable, in the order of the nth to mth memories and the first to (n−1)th memories, based on the start-position specification address and the data width of the data.

The data output circuit may include: an output data sorting circuit that sorts the plurality of pieces of divided data, each being the k-bit data, output from the m memories, in the order of the nth to mth memory and the first to (n−1)th memories, and outputs the sorted plurality of pieces of divided data, based on the start-position specification address; and an output data selecting circuit that selects the divided data corresponding to the data width of the data from m pieces of the divided data output from the output data sorting circuit, and outputs the selected divided data.

The output data selecting circuit may include: m logical product circuits (first to mth logical circuits), to which each of the m pieces of the divided data output from the output data sorting circuit is input sequentially; and a mask data input circuit that inputs one logical value for outputting the divided data to the second to (D/k)th logical product circuits, and inputs the other logical value for masking the divided data to be output to the (D/k+1)th to mth logical product circuits, based on the data width of the data.

The start-position specification address may be a low-order j bits of the A-bit address.

The other features of the present invention will become apparent from the following description of this specification and the accompanying drawings.

BRIEF DESCRIPTION OF THE DRAWINGS

To understand the present invention and the advantages thereof more thoroughly, the following description should be referenced in conjunction with the accompanying drawings, in which:

FIG. 3 is a truth table of operation of a selector S0;

FIG. 4 is a truth table of operation of a decoder 12;

FIG. 5 is a truth table of operation of selectors S1 to S3;

FIG. 7 is a truth table of operation of a decoder 31;

FIG. 8 depicts a relationship between WD_LENGTH input to the input IN of the decoder 12 and a data width;

FIG. 9 is a truth table of operation of the decoder 12 in a memory control circuit 1a;

FIG. 10 is a truth table of operation of the selector S1 in the memory control circuit 1a;

FIG. 11 is a truth table of operation of selectors S2a to S2d;

FIG. 12 is a truth table of operation of selectors S3a to S3d;

FIG. 24 depicts a method of packing a plurality of data with different data widths into a memory.

DETAILED DESCRIPTION OF THE INVENTION

From the contents of the description and the accompanying drawings, at least the following details will become apparent.

==Configuration of Memory Control circuit==

Figure 1:
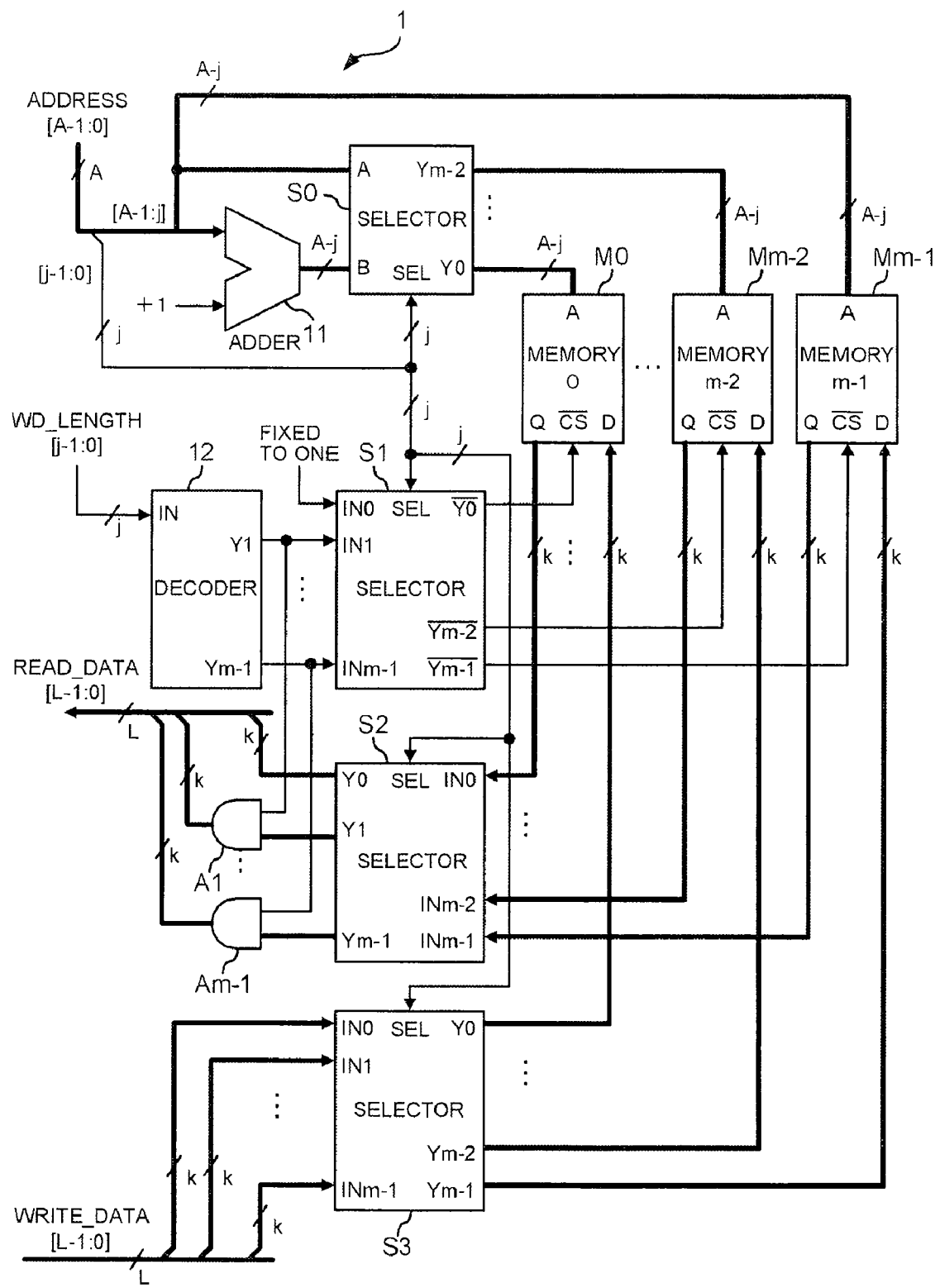
FIG. 1 depicts a configuration of a memory control circuit of an embodiment of the present invention.

FIG. 1 depicts a configuration of a memory control circuit of an embodiment of the present invention. A memory control circuit 1 is a circuit that controls read/write of data for m memories M0 to Mm−1 which are k-bit wide, for example, and includes an adder 11, a decoder 12, selectors S0 to S3, and AND circuits A1 to Am−1.

Figure 2:
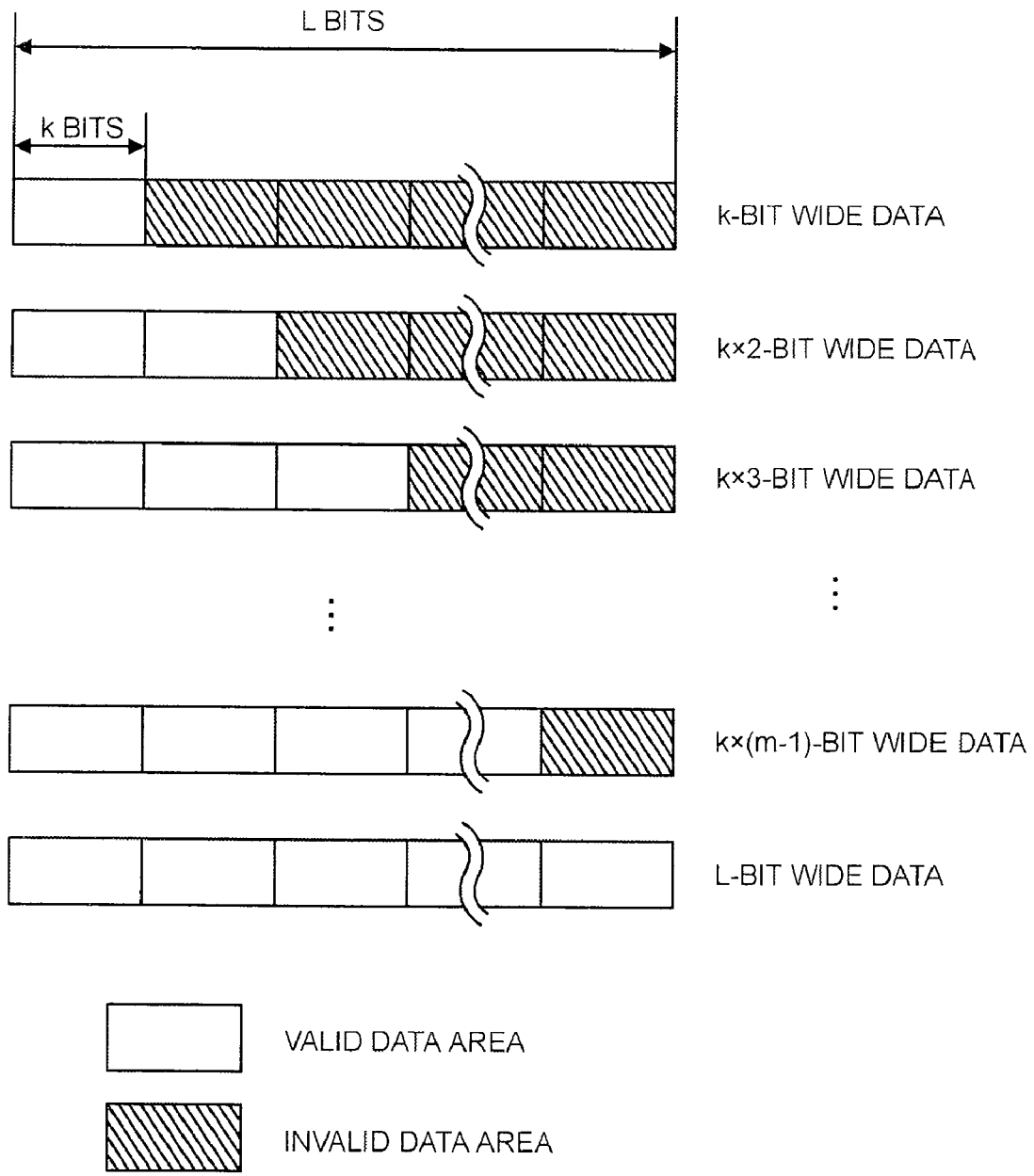
FIG. 2 depicts an example of data stored in memories M0 to Mm−1.

FIG. 2 depicts an example of data stored in the memories M0 to Mm−1. As shown in FIG. 2, a data width of the stored data is an integral multiple of k bits up to L bits. The number of the memories M0 to Mm−1 is "m" and m=L/k. Although a data format is left-aligned as shown in FIG. 2 in this embodiment, the data format is not limited to left-aligned and can be other formats such as right-aligned.

For example, an A-bit address bus ADDRESS receives input of an address [A-1:0] for specifying data stored in the memories M0 to Mm−1. The input A of the selector S0 receives input of the high-order A−j bits [A-1:j] (hereinafter, "first specification address") of the A-bit address. The input B of the selector S0 receives an address (hereinafter, "second specification address") obtained by adding one to the first specification address with the adder 11. The input SEL of the selector S0 receives input of the low-order j bits [j-1:] (hereinafter, "start-position specification address") of the A-bit address.

The start-position specification address indicates from which one of the m memories M0 to Mm−1 the data with various data widths shown in FIG. 2 are stored, and the number of bits is "j", which is $2^{j-1} < m \leq 2^j$. Either the first specification address or the second specification address is output based on the start-position specification address from the outputs Y0 to Ym−2 of the selector S0 and is input to the address inputs A of the memories M0 to Mm. The address input A of the memory Mm−1 receives input of the first specification address.

FIG. 3 is a truth table of the operation of the selector S0. As shown in FIG. 3, for example, if a value of the input SEL of the selector S0 is "0" (decimal number), the outputs Y0 to Ym−2 are the first specification address (input A). If a value of the input SEL is "1" (decimal number), the outputs Y1 to Ym−2 are the first specification address (input A) and the output Y0 is the second specification address (input B). Similarly, if a value of the input SEL is "p" (decimal number), the outputs Yp to Ym−2 are the first specification address (input A) and the outputs Y0 to Yp−1 are the second specification address (input B). If a value of the input SEL is "m−1" (decimal number), all the outputs Y0 to Ym−2 are the second specification address (input B).

The input IN of the decoder 12 receives input of WD_LENGTH indicated by j-bit [j-1:0], for example. This WD_LENGTH is a value indicating a data width of the data shown in FIG. 2 and is represented by how many times the data are larger than k bits. For example, if the data are k×q-bit wide data shown in FIG. 2, the value of WD_LENGTH is "q−1" (decimal number). The data width of the data shown in FIG. 2 may directly be used as WD_LENGTH. For example, in the case of k×q-bit wide data, the value of WD_LENGTH may be "k×q". However, the number of bits of WD_LENGTH can be reduced when indicated by how many times the data are larger than k bits, as shown in this embodiment.

FIG. 4 is a truth table of operation of the decoder 12. As shown in FIG. 4, for example, if a value of the input IN of the decoder 12 is "r" (decimal number), the outputs Y1 to Yr are "1" and the outputs Yr+1 to Ym−1 are "0". That is, the number of memories necessary for storing the data shown in FIG. 2 among the memories M0 to Mm−1 is obtained by adding one to the number of "1s" in the outputs Y1 to Ym−1.

The selector S1 enables read/write of the necessary memories among the memories M0 to Mm−1 based on the start-position specification address and the outputs Y1 to Ym−1 of the decoder 12. The input IN0 of the selector S1 receives input of "1", and the inputs IN1 to INm−1 receive the outputs Y1 to Ym−1 from the decoder 12. The outputs /Y0 to /Ym−1 of the selector S1 output the inputs IN0 to INm−1 sorted and inverted based on the start-position specification address input to the input SEL, which are input to the input /CS for enabling read/write of the memories M0 to Mm−1.

FIG. 5 is a truth table of operation of selectors S1 to S3. As shown in FIG. 5, for example, if a value of the input SEL of the selector S1 is "0" (decimal number), the outputs /Y0 to /Ym−1 are /IN0 to /INm−1. For example, a data width is k×3 bits, /Y0 to /Y2 are "0"; /Y3 to /Ym−1 are "1"; and the memories M0 to M2 become the readable/writable state. Similarly, if a value of the input SEL is "s" (decimal number), /IN0 to /INm−1 are output in the order of the outputs /Ys to /Ym−1 and /Y0 to /Ys−1. If a data width is k×q bits, q memories become the readable/writable state in the order of the memories Ms to Mm−1 and M0 to Ms−1.

The selector S2 is a circuit that sorts and outputs k-bit data (divided data) read from the memories M0 to Mm−1. The inputs IN0 to INm−1 sequentially receive input of the data outputs Q (k-bit) of the memories M0 to Mm−1. The input SEL of the selector S2 receives input of the start-position specification address. The outputs Y0 to Ym−1 of the selector S2 output data obtained by sorting the input IN0 to INm−1 based on the start-position specification address.

As shown in the truth table of FIG. 5, if a value of the input SEL of the selector S2 is "0" (decimal number), the outputs /Y0 to /Ym−1 are the inputs /IN0 to /INm−1, respectively. Similarly, if a value of the input SEL is "t" (decimal number), the inputs /IN0 to /INm−1 are sorted and output in the order of the outputs /Yt to /Ym−1 and /Y0 to /Yt−1.

The output Y0 of the selector S2 is connected to the high-order k bits of a read data bus READ_DATA of L bits [L-1:0], for example, and the outputs Y1 to Ym−1 are connected to the remaining L−k bits of the read data bus through the AND circuits A1 to Am−1, respectively. The AND circuits A1 to Am−1 receive the outputs Y1 to Ym−1 from the decoder 12. Therefore, if a data width is k×q bits, since the outputs Y1 to Yq−1 from the decoder 12 are "1" and Yq to Ym−1 are "0", the AND circuits Aq to Am−1 perform zero-clear (zero-mask) of Yq to Ym−1 after the k×q bits among the L-bit data configured by the outputs Y0 to Ym−1. As a result, the read data with a data width of k bits to L bits are output to the data bus READ_DATA.

The selector S3 is a circuit that divides the k-bit to L-bit write data on the L-bit write data bus WRITE_DATA [L-1:0] into k-bit data to sort and output the divided data based on the start-position specification address. IN0 to INm−1 of the selector S3 receive input of the data (divided data) formed by dividing the write data for every k bits sequentially from the highest order. The inputs IN0 to INm−1 are sorted based on the start-position specification address and are output as the outputs Y0 to Ym−1 to the input D of the memories M0 to Mm−1.

As shown in the truth table of FIG. 5, if a value of the input SEL of the selector S3 is "0" (decimal number), the outputs /Y0 to /Ym−1 are the inputs /IN0 to /INm−1, respectively. Similarly, if a value of the input SEL is "t" (decimal number), the inputs /IN0 to /INm−1 are sorted and output in the order of the outputs /Yt to /Ym−1 and /Y0 to /Yt−1.

The adder 11 and the selector S0 correspond to an address input circuit of the present invention; the selector S3 corresponds to a data input circuit of the present invention; the selector S2, the decoder 12, and the AND circuits A1 to Am−1 correspond to the data output circuit of the present invention; and the decoder 12 and the selector S1 correspond to a memory selecting circuit of the present invention.

The selector S2 corresponds to an output data sorting circuit of the present invention, and the decoder 12 and the AND circuits A1 to Am−1 correspond to an output data selecting circuit of the present invention. The AND circuits A1 to Am−1 correspond to a logical product circuit of the present invention, and the decoder 12 corresponds to a mask data input circuit of the present invention.

=Operation Description with Specific Examples=

Figure 6:
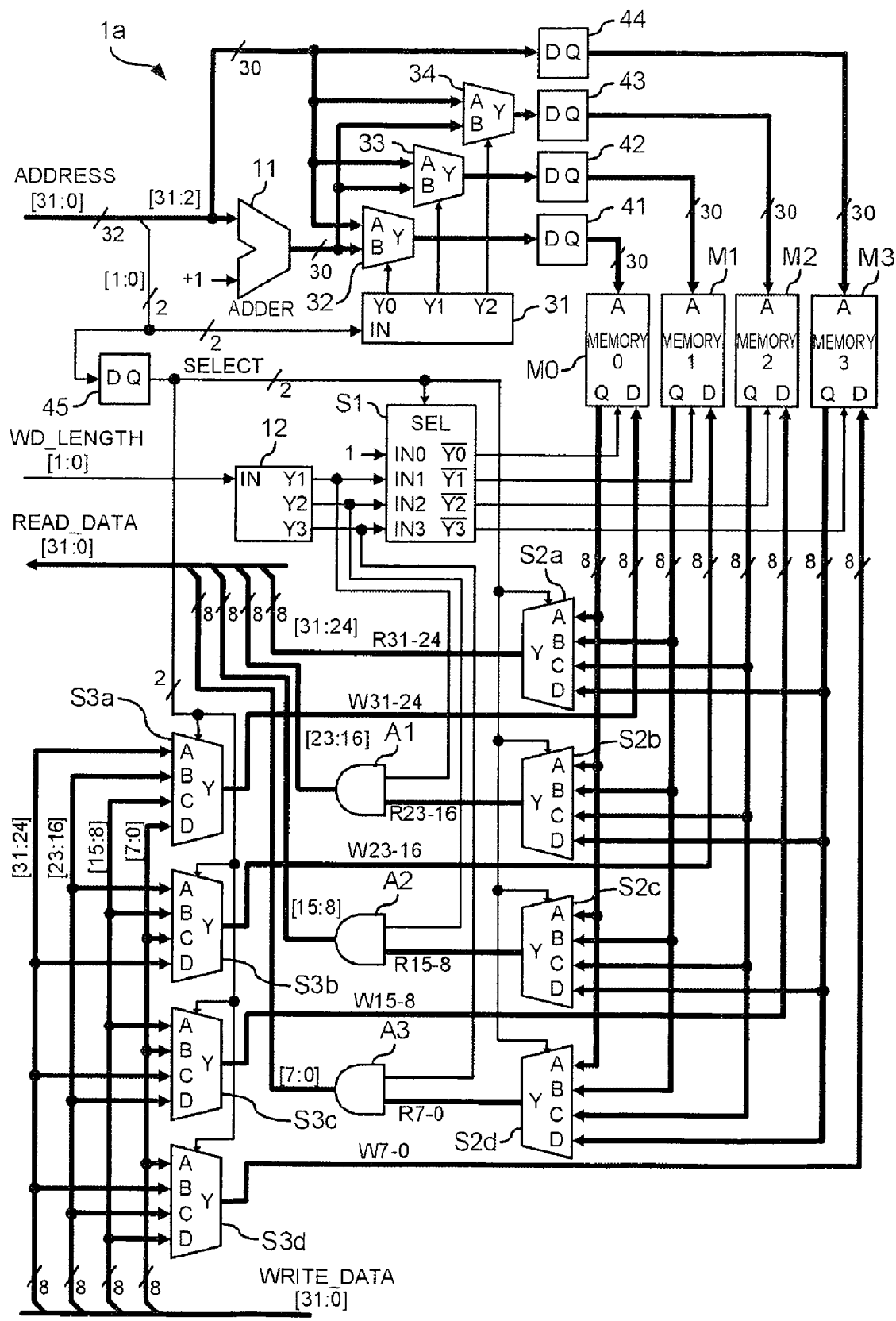
FIG. 6 depicts a specific example of a memory control circuit 1 shown in FIG. 1.

Operation of the memory control circuit 1 will be described with specific examples. FIG. 6 depicts a specific example of the memory control circuit 1 shown in FIG. 1. A memory control circuit 1a is a circuit that controls four 8-bit wide memories M0 to M3 (k=8, m=4), a data width of the readable/writable data is 8 bits to 32 bits (in every 8 bits). The number of bits for selecting the memories M0 to M3 is "j", which is j=2 because of the relationship of $2^{j-1} < m \leq 2^j$.

In the memory control circuit 1a, a decoder 31 and selectors 32 to 34 configure the selector S0 shown in FIG. 1. The selectors S2a to S2d configure the selector S2 shown in FIG. 1, and the selectors S3a to S3d configure the selector S3 shown in FIG. 1. D-flip-flops 41 to 45 are disposed for retaining data.

The input IN of the decoder 31 receives input of the low-order two bits [1:0] (start-position specification address) of 32-bit address [31:0]. A value corresponding to the start-position specification address is output from the outputs Y0 to Y2 of the decoder 31. The selector 32 receives the output Y0 from the decoder 31, outputs the input A (high-order 30 bits of the address: the first specification address) if the output Y0 of the decoder 31 is "0", for example, and outputs the input B (high-order 30 bits of the address+1: the second specification address) if the output Y0 of the decoder 31 is "1", for example. The selectors 33, 34 also output the first specification address or the second specification address depending on the outputs Y1, Y2 from the decoder 31.

FIG. 7 is a truth table of operation of the decoder 31. As shown in FIG. 7, if a value of the input IN of the decoder 31 is "0" (decimal number), all the outputs Y0 to Y2 are "0". In this case, the selectors 32 to 34 output the first specification address. If a value of the input IN of the decoder 31 is "1" (decimal number), the outputs Y1 and Y2 are "0" and the output Y0 is "1". In this case, the selectors 33 and 34 output the first specification address, and the selector 32 outputs the second specification address. If a value of the input IN of the decoder 31 is "2" (decimal number), the output Y2 is "0", and the outputs Y0 and Y1 are "1". In this case, the selector 34 outputs the first specification address, and the selectors 32 and 33 output the second specification address. If a value of the input IN of the decoder 31 is "3" (decimal number), all the outputs Y0 to Y2 are "1". In this case, the selectors 32 to 34 output the second specification address.

FIG. 8 depicts a relationship between WD_LENGTH input to the input IN of the decoder 12 and a data width. As shown in FIG. 8, a data width is a value obtained by adding one to WD_LENGTH and multiplying by eight (data width=8 bits× (WD_LENGTH+1)). FIG. 9 is a truth table of operation of the decoder 12 in the memory control circuit 1a. As shown in FIG. 9, if a value of the input IN of the decoder 12 is "0" (decimal number), all the outputs Y1 to Y3 are "0". If a value of the input IN of the decoder 12 is "1" (decimal number), the outputs Y2 and Y3 are "0" and the output Y1 is "1". If a value of the input IN of the decoder 12 is "2" (decimal number), the output Y3 is "0", and the outputs Y1 and Y2 are "1". If a value of the input IN of the decoder 12 is "3" (decimal number), all the outputs Y1 to Y3 are "1".

FIG. 10 is a truth table of operation of the selector S1 in the memory control circuit 1a. As shown in FIG. 10, if the start-position specification address (low-order two bits [1:0] of the 32-bit address) input to the input SEL is "0" (decimal number), values obtained by inverting IN0 to IN3 are output in the order of the outputs /Y0 to /Y3. If the input SEL is "1" (decimal number), values obtained by inverting IN0 to IN3 are output in the order of the outputs /Y1 to /Y3 and /Y0. If the input SEL is "2" (decimal number), values obtained by inverting IN0 to IN3 are output in the order of the outputs /Y2, /Y3, /Y0, and /Y1. If the input SEL is "3" (decimal number), values obtained by inverting IN0 to IN3 are output in the order of the outputs /Y3, /Y0 to /Y2.

FIG. 11 is a truth table of operation of the selectors S2a to S2d in the memory control circuit 1a. As shown in FIG. 11, if the start-position specification address (low-order two bits [1:0] of the 32-bit address) input to the input SEL is "0" (decimal number), the output (R31-24) of the selector S2a is data output from the memory M0; the output (R23-16) of the selector S2b is data output from the memory M1; the output (R15-8) of the selector S2c is data output from the memory M2; and the output (R7-0) of the selector S2d is data output from the memory M3.

That is, if the start-position specification address is "0" (decimal number), the read data are output in the order of the memories M0 to M3. As shown in the truth table of FIG. 11, if the start-position specification address is "1" (decimal number), the read data are output in the order of the memories M1 to M3 and M0. If the start-position specification address is "2" (decimal number), the read data are output in the order of the memories M2, M3, M0, and M1. If the start-position specification address is "3" (decimal number), the read data are output in the order of the memories M3 and M0 to M2.

FIG. 12 is a truth table of operation of the selectors S3a to S3d. As shown in FIG. 12, if the start-position specification address (low-order two bits [1:0] of the 32-bit address) input to the input SEL is "0" (decimal number), the output (W31-24) of the selector S3a is the high-order eight bits [31:24] of the write data; the output (W23-16) of the selector S3b is the next eight bits [23:16] of the write data; the output (W15-8) of the selector S3c is the further next eight bits [15:8] of the write data; and the output (W7-0) of the selector S3d is the low-order eight bits [7:0] of the write data.

That is, if the start-position specification address is "0" (decimal number), the data (divided data) formed by dividing the write data for every eight bits are output sequentially from the highest order to the memories M0 to M3. As shown in the truth table of FIG. 12, if the start-position specification address is "1" (decimal number), the divided data are output sequentially from the highest order to the memories M1 to M3 and M0. If the start-position specification address is "2" (decimal number), the divided data are output sequentially from the highest order to the memories M2, M3, M0, and M1. If the start-position specification address is "3" (decimal number), the divided data are output sequentially from the highest order to the memories M3, M0 to M2.

The reading/writing (READ/WRITE) operation of the memory control circuit 1a will be specifically described.

(1) READ (head address: No. 4n)

Figure 13:
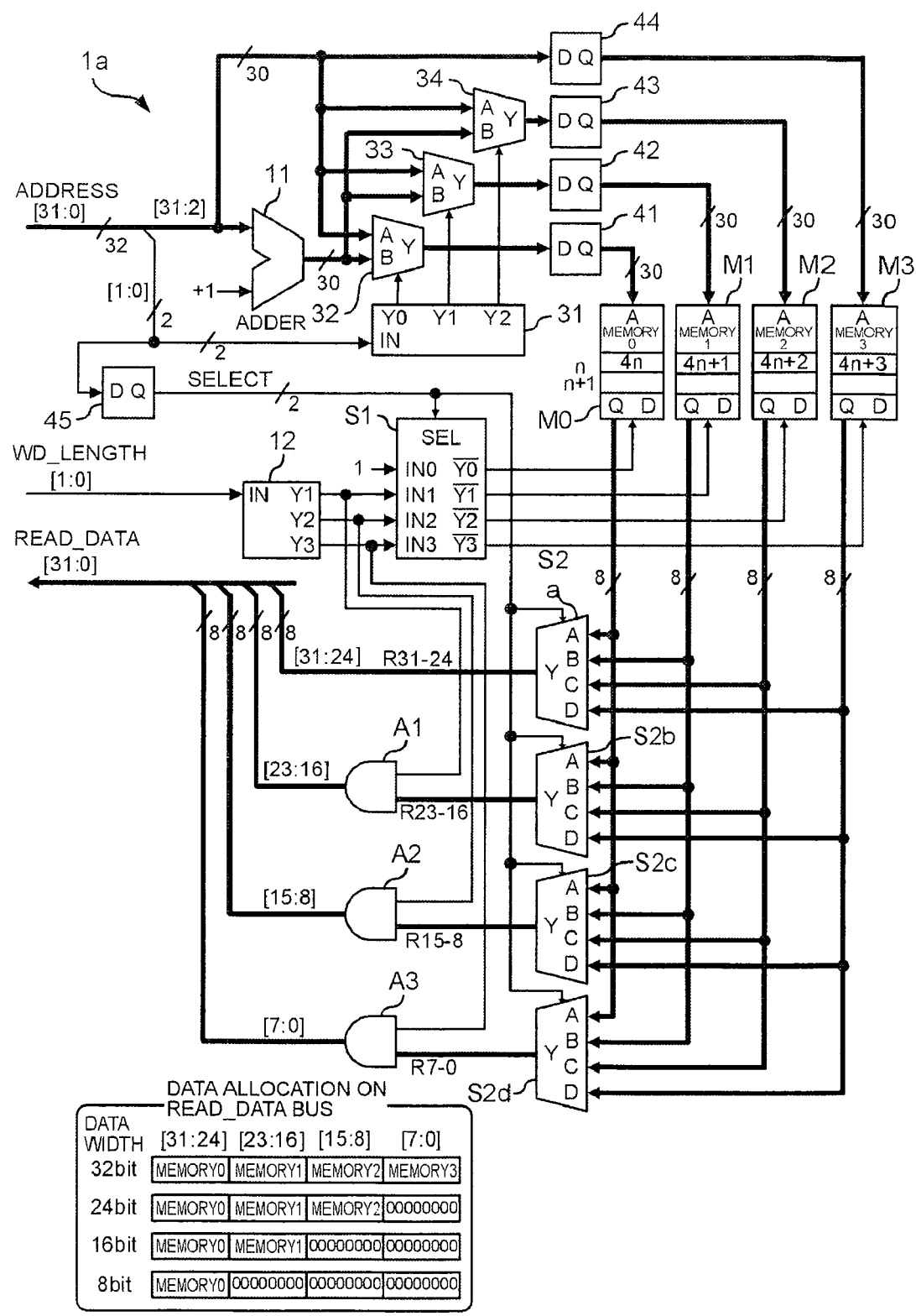
FIG. 13 depicts an example of data allocation when a head address of read data is No. 4n.

FIG. 13 depicts an example of data allocation when a head address of read data is No. 4n. If the head address of read data is No. 4n, the low-order two bits [1:0] of the 32-bit address are "0" (decimal number). Therefore, all the outputs Y0 to Y2 of the decoder 31 are "0", and the selectors 32 to 34 output the first specification address. That is, No. n is input to the address inputs A of the memories M0 to M3.

If the data width of the read data is 32 bits, WD_LENGTH is "3" (decimal number). In this case, all the outputs Y1 to Y3 of the decoder 12 are "1". Therefore, all the outputs /Y0 to /Y3 of the selector S1 are "0" and all the memories M0 to M3 become readable. Data at No. n in the memories M0 to M3 are output from the data outputs Q. These data output from the memories M0 to M3 are data at Nos. 4n to 4n+3 in the entire address space of the memories M0 to M3. The data read from the memories M0 to M3 are sequentially output from the selectors S2a to S2d. Since all the outputs Y1 to Y3 of the decoder 12 are "1", the data read from the memories M1 to M3 are not cleared by the AND circuits A1 to A3. As a result, 32-bit wide data are output to the read data bus READ_DATA.

If the data width of the read data is 24 bits, WD_LENGTH is "2" (decimal number). In this case, the outputs Y1 and Y2 are "1" and the output Y3 is "0" in the decoder 12. Therefore, since the outputs /Y0 to /Y2 are "0" and the output /Y3 is "1" in the selector S1, the memories M0 to M2 become readable and the memory M3 becomes unreadable. As a result, the outputs (R7-0) of the selector S2d become invalid data, and the AND circuit A3 performs zero-clear of the invalid data to output 24-bit wide left-aligned data to the read data bus READ_DATA.

If the data width of the read data is 16 bits, WD_LENGTH is "1" (decimal number). In this case, the output Y1 is "1" and the outputs Y2 and Y3 are "0" in the decoder 12. Therefore, since the outputs /Y0 and /Y1 are "0" and the outputs /Y2 and /Y3 are "1" in the selector S1, the memories M0 and M1 become readable and the memories M2 and M3 become unreadable. As a result, the outputs (R15-8, R7-0) of the selectors S2c and S2d become invalid data, and the AND circuits A2 and A3 perform zero-clear of the invalid data to output 16-bit wide left-aligned data to the read data bus READ_DATA.

If the data width of the read data is 8 bits, WD_LENGTH is "0" (decimal number). In this case, all the outputs Y1 to Y3 of the decoder 12 are "0". Therefore, since the output /Y0 is "0" and the outputs /Y1 to /Y3 are "1" in the selector S1, the memory M0 becomes readable and the memories M1 to M3 become unreadable. As a result, the outputs (R23-16, R15-8, R7-0) of the selectors S2b to S2d become invalid data, and the AND circuits A1 to A3 perform zero-clear of the invalid data to output 8-bit wide left-aligned data to the read data bus READ_DATA.

(2) READ (head address: No. 4n+1)

Figure 14:
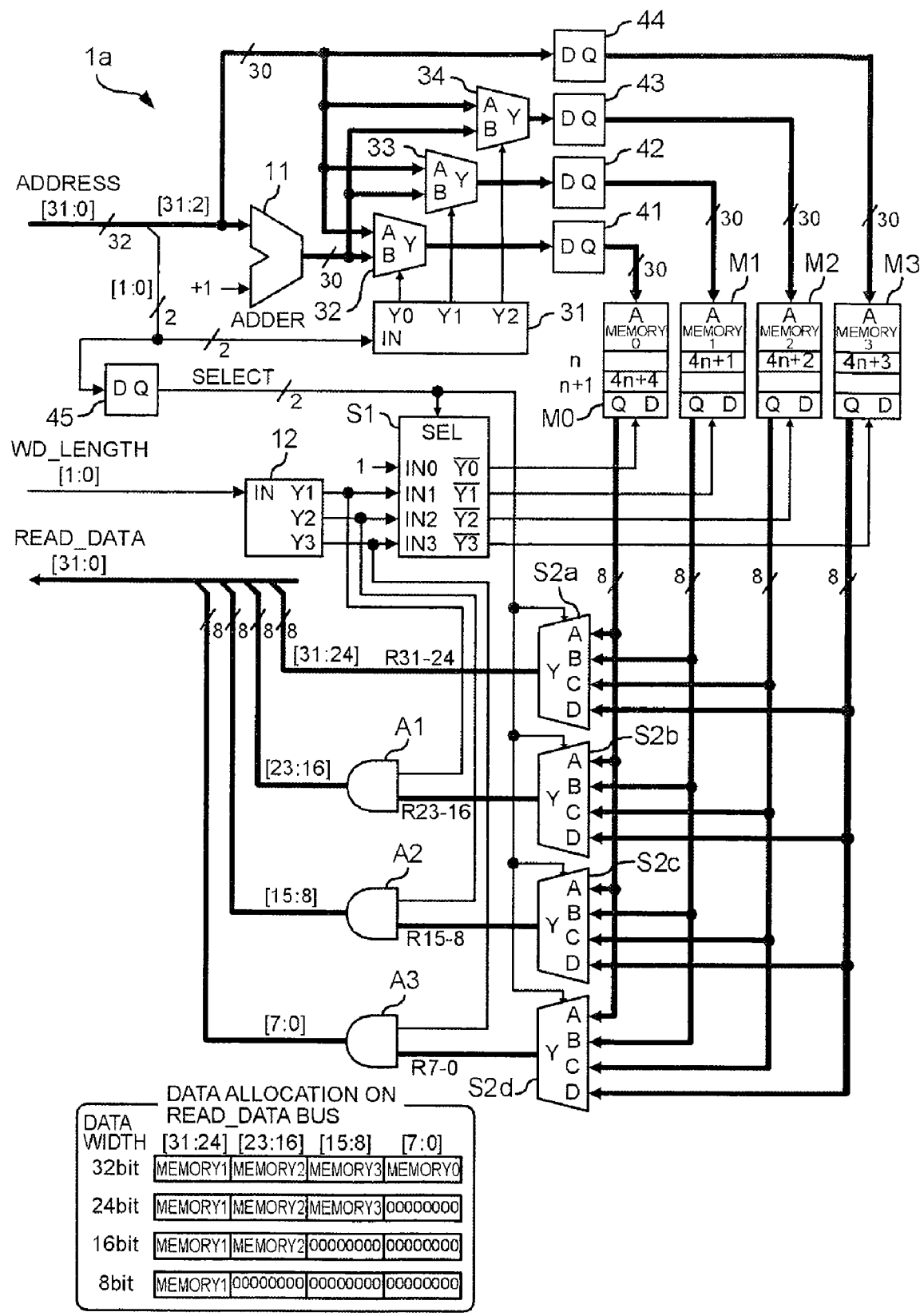
FIG. 14 depicts an example of data allocation when a head address of read data is No. 4n+1.

FIG. 14 depicts an example of data allocation when a head address of read data is No. 4n+1. If the head address of read data is No. 4n+1, the low-order two bits [1:0] of the 32-bit address are "1" (decimal number). Therefore, since the output Y0 is "1" and the outputs Y1 and Y2 are "0" in the decoder 31, the selectors 33, 34 output the first specification address and the selector 32 outputs the second specification address. That is, No. n is input to the address inputs A of the memories M1 to M3, and No. n+1 is input to the address input A of the memory M0.

If the data width of the read data is 32 bits, WD_LENGTH is "3" (decimal number). In this case, all the outputs Y1 to Y3 of the decoder 12 are "1". Therefore, all the outputs /Y0 to /Y3 of the selector S1 are "0" and all the memories M0 to M3 become readable. Data at No. n in the memories M1 to M3 and data at No. n+1 in the memory M0 are output from the data outputs Q. These data output from the memories M1 to M3 and M0 are data at Nos. 4n+1 to 4n+4 in the entire address space of the memories M0 to M3. The data read from the memories M1 to M3 and M0 are sequentially output from the selectors S2a to S2d. Since all the outputs Y1 to Y3 of the decoder 12 are "1", the data read from the memories M2, M3, and M0 are not cleared by the AND circuits A1 to A3. As a result, 32-bit wide data are output to the read data bus READ_DATA.

If the data width of the read data is 24 bits, WD_LENGTH is "2" (decimal number). In this case, the outputs Y1 and Y2 are "1" and the output Y3 is "0" in the decoder 12. Therefore, since the outputs /Y1 to /Y3 are "0" and the output /Y0 is "1" in the selector S1, the memories M1 to M3 become readable and the memory M0 becomes unreadable. As a result, the outputs (R7-0) of the selector S2d become invalid data, and the AND circuit A3 performs zero-clear of the invalid data to output 24-bit wide left-aligned data to the read data bus READ_DATA.

If the data width of the read data is 16 bits, WD_LENGTH is "1" (decimal number). In this case, the output Y1 is "1" and the outputs Y2 and Y3 are "0" in the decoder 12. Therefore, since the outputs /Y1 and /Y2 are "0" and the outputs /Y3 and /Y0 are "1" in the selector S1, the memories M1 and M2 become readable and the memories M3 and M0 become unreadable. As a result, the outputs (R15-8, R7-0) of the selectors S2c and S2d become invalid data, and the AND circuits A2 and A3 perform zero-clear of the invalid data to output 16-bit wide left-aligned data to the read data bus READ_DATA.

If the data width of the read data is 8 bits, WD_LENGTH is "0" (decimal number). In this case, all the outputs Y1 to Y3 of the decoder 12 are "0". Therefore, since the output /Y1 is "0" and the outputs /Y2, /Y3, and /Y0 are "1" in the selector S1, the memory M1 becomes readable and the memories M2, M3, and M0 become unreadable. As a result, the outputs (R23-16, R15-8, R7-0) of the selectors S2b to S2d become invalid data, and the AND circuits A1 to A3 perform zero-clear of the invalid data to output 8-bit wide left-aligned data to the read data bus READ_DATA.

(3) READ (head address: No. 4n+2)

Figure 15:
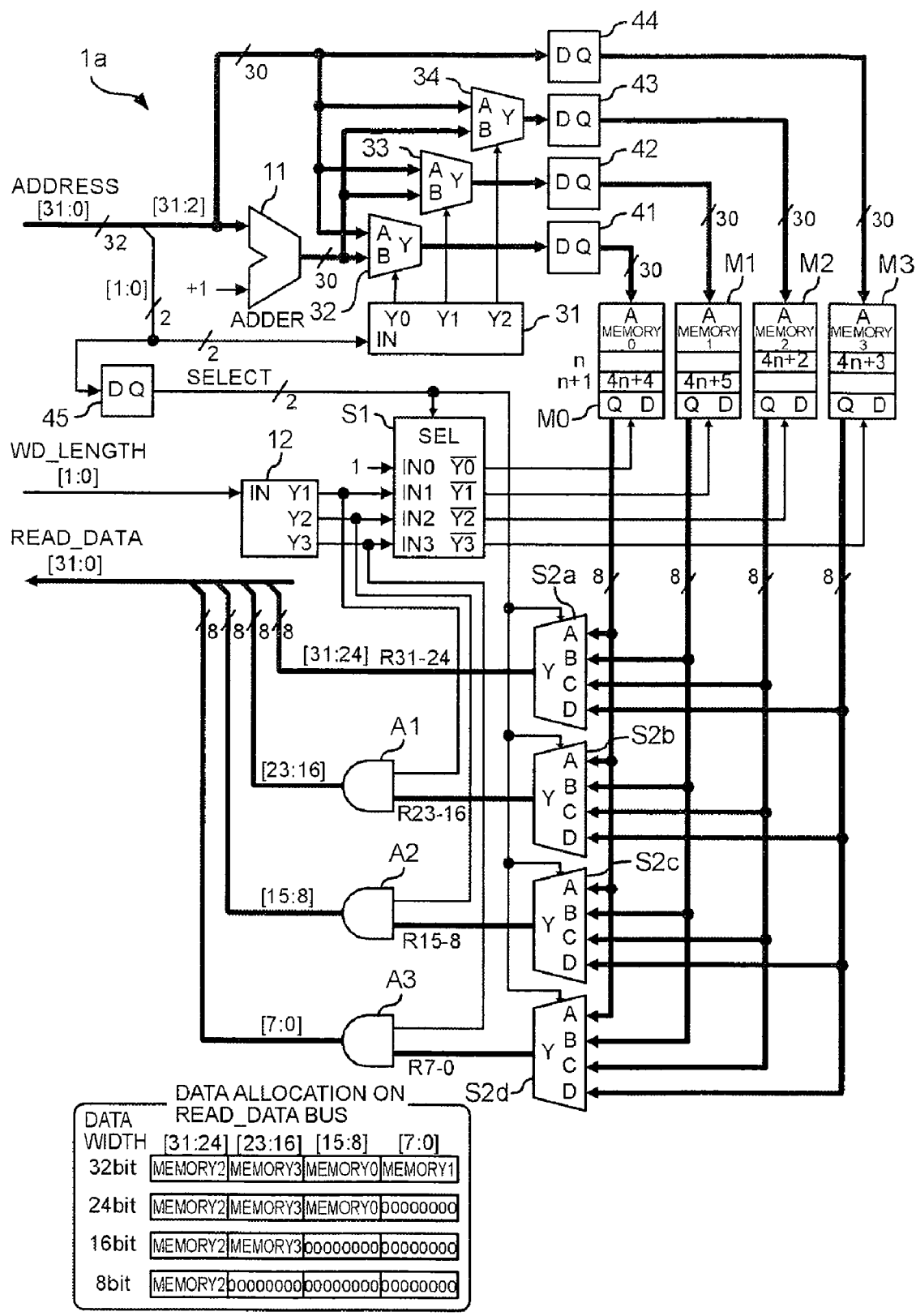
FIG. 15 depicts an example of data allocation when a head address of read data is No. 4n+2.

FIG. 15 depicts an example of data allocation when a head address of read data is No. 4n+2. If the head address of read data is No. 4n+2, the low-order two bits [1:0] of the 32-bit address are "2" (decimal number). Therefore, since the outputs Y0 and Y1 are "1" and the output Y2 is "0" in the decoder 31, the selector 34 outputs the first specification address and the selectors 32, 33 output the second specification address. That is, No. n is input to the address inputs A of the memories M2 and M3, and No. n+1 is input to the address inputs A of the memories M0 and M1.

If the data width of the read data is 32 bits, WD_LENGTH is "3" (decimal number). In this case, all the outputs Y1 to Y3 of the decoder 12 are "1". Therefore, all the outputs /Y0 to /Y3 of the selector S1 are "0" and all the memories M0 to M3 become readable. Data at No. n in the memories M2, M3 and data at No. n+1 in the memories M0, M1 are output from the data outputs Q. These data output from the memories M2, M3, M0, and M1 are data at Nos. 4n+2 to 4n+5 in the entire address space of the memories M0 to M3. The data read from the memories M2, M3, M0, and M1 are sequentially output from the selectors S2a to S2d. Since all the outputs Y1 to Y3 of the decoder 12 are "1", the data read from the memories M3, M0, M1 are not cleared by the AND circuits A1 to A3. As a result, 32-bit wide data are output to the read data bus READ_DATA.

If the data width of the read data is 24 bits, WD_LENGTH is "2" (decimal number). In this case, the outputs Y1 and Y2 are "1" and the output Y3 is "0" in the decoder 12. Therefore, since the outputs /Y2, /Y3, and /Y0 are "0" and the output /Y1 is "1" in the selector S1, the memories M2, M3, and M0 become readable and the memory M1 becomes unreadable. As a result, the outputs (R7-0) of the selector S2d become invalid data, and the AND circuit A3 performs zero-clear of the invalid data to output 24-bit wide left-aligned data to the read data bus READ_DATA.

If the data width of the read data is 16 bits, WD_LENGTH is "1" (decimal number). In this case, the output Y1 is "1" and the outputs Y2 and Y3 are "0" in the decoder 12. Therefore, since the outputs /Y2 and /Y3 are "0" and the outputs /Y0 and /Y1 are "1" in the selector S1, the memories M2 and M3 become readable and the memories M0 and M1 become unreadable. As a result, the outputs (R15-8, R7-0) of the selectors S2c and S2d become invalid data, and the AND circuits A2 and A3 perform zero-clear of the invalid data to output 16-bit wide left-aligned data to the read data bus READ_DATA.

If the data width of the read data is 8 bits, WD_LENGTH is "0" (decimal number). In this case, all the outputs Y1 to Y3 of the decoder 12 are "0". Therefore, since the output /Y2 is "0" and the outputs /Y3, /Y0, and /Y1 are "1" in the selector S1, the memory M2 becomes readable and the memories M3, M0, and M1 become unreadable. As a result, the outputs (R23-16, R15-8, R7-0) of the selectors S2b to S2d become invalid data, and the AND circuits A1 to A3 perform zero-clear of the invalid data to output 8-bit wide left-aligned data to the read data bus READ_DATA.

(4) READ (head address: No. 4n+3)

Figure 16:
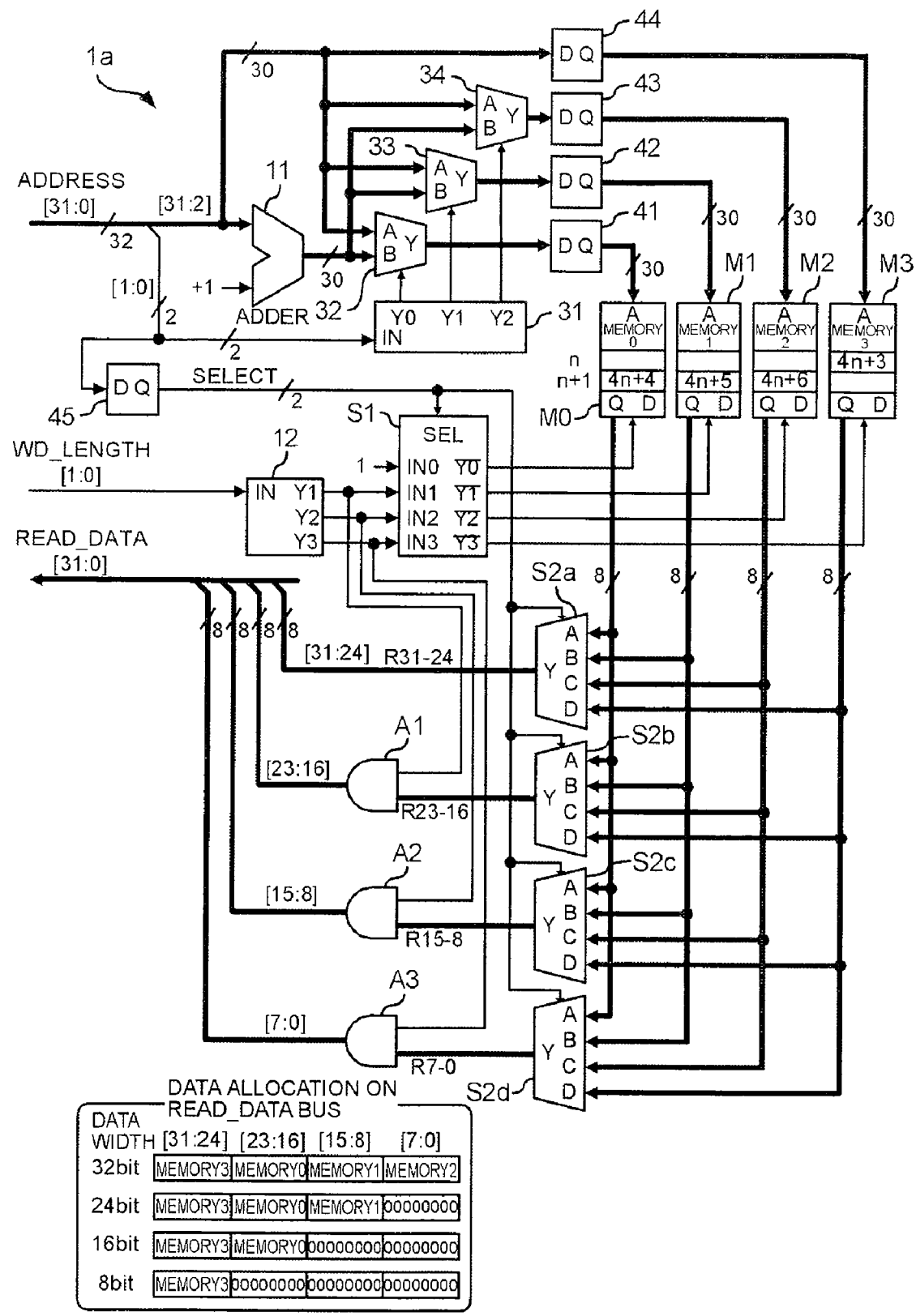
FIG. 16 depicts an example of data allocation when a head address of read data is No. 4n+3.

FIG. 16 depicts an example of data allocation when a head address of read data is No. 4n+3. If the head address of read data is No. 4n+3, the low-order two bits [1:0] of the 32-bit address are "3" (decimal number). Therefore, since all the outputs Y0 and Y3 of the decoder 31 are "1", the selectors 32 to 34 output the second specification address. That is, No. n is input to the address input A of the memory M3, and No. n+1 is input to the address inputs A of the memories M0 and M2.

If the data width of the read data is 32 bits, WD_LENGTH is "3" (decimal number). In this case, all the outputs Y1 to Y3 of the decoder 12 are "1". Therefore, all the outputs /Y0 to /Y3 of the selector S1 are "0" and all the memories M0 to M3 become readable. Data at No. n in the memory M3 and data at No. n+1 in the memories M0 to M2 are output from the data outputs Q. These data output from the memories M3 and M0 to M2 are data at Nos. 4n+3 to 4n+6 in the entire address space of the memories M0 to M3. The data read from the memories M3 and M0 to M2 are sequentially output from the selectors S2a to S2d. Since all the outputs Y1 to Y3 of the decoder 12 are "1", the data read from the memories M0 to M2 are not cleared by the AND circuits A1 to A3. As a result, 32-bit wide data are output to the read data bus READ_DATA.

If the data width of the read data is 24 bits, WD_LENGTH is "2" (decimal number). In this case, the outputs Y1 and Y2 are "1" and the output Y3 is "0" in the decoder 12. Therefore, since the outputs /Y3, /Y0, and /Y1 are "0" and the output /Y2 is "1" in the selector S1, the memories M3, M0, and M1 become readable and the memory M2 becomes unreadable. As a result, the outputs (R7-0) of the selector S2d become invalid data, and the AND circuit A3 performs zero-clear of the invalid data to output 24-bit wide left-aligned data to the read data bus READ_DATA.

If the data width of the read data is 16 bits, WD_LENGTH is "1" (decimal number). In this case, the output Y1 is "1" and the outputs Y2 and Y3 are "0" in the decoder 12. Therefore, since the outputs /Y3 and /Y0 are "0" and the outputs /Y1 and /Y2 are "1" in the selector S1, the memories M3 and M0 become readable and the memories M1 and M2 become unreadable. As a result, outputs (R15-8, R7-0) of the selectors S2c and S2d become invalid data, and the AND circuits A2 and A3 perform zero-clear of the invalid data to output 16-bit wide left-aligned data to the read data bus READ_DATA.

If the data width of the read data is 8 bits, WD_LENGTH is "0" (decimal number). In this case, all the outputs Y1 to Y3 of the decoder 12 are "0". Therefore, since the output /Y3 is "0" and the outputs /Y0 to /Y2 are "1" in the selector S1, the memory M3 becomes readable and the memories M0 to M2 become unreadable. As a result, the outputs (R23-16, R15-8, R7-0) of the selectors S2b to S2d become invalid data, and the AND circuits A1 to A3 perform zero-clear of the invalid data to output 8-bit wide left-aligned data to the read data bus READ_DATA.

(5) WRITE (head address: No. 4n)

Figure 17:
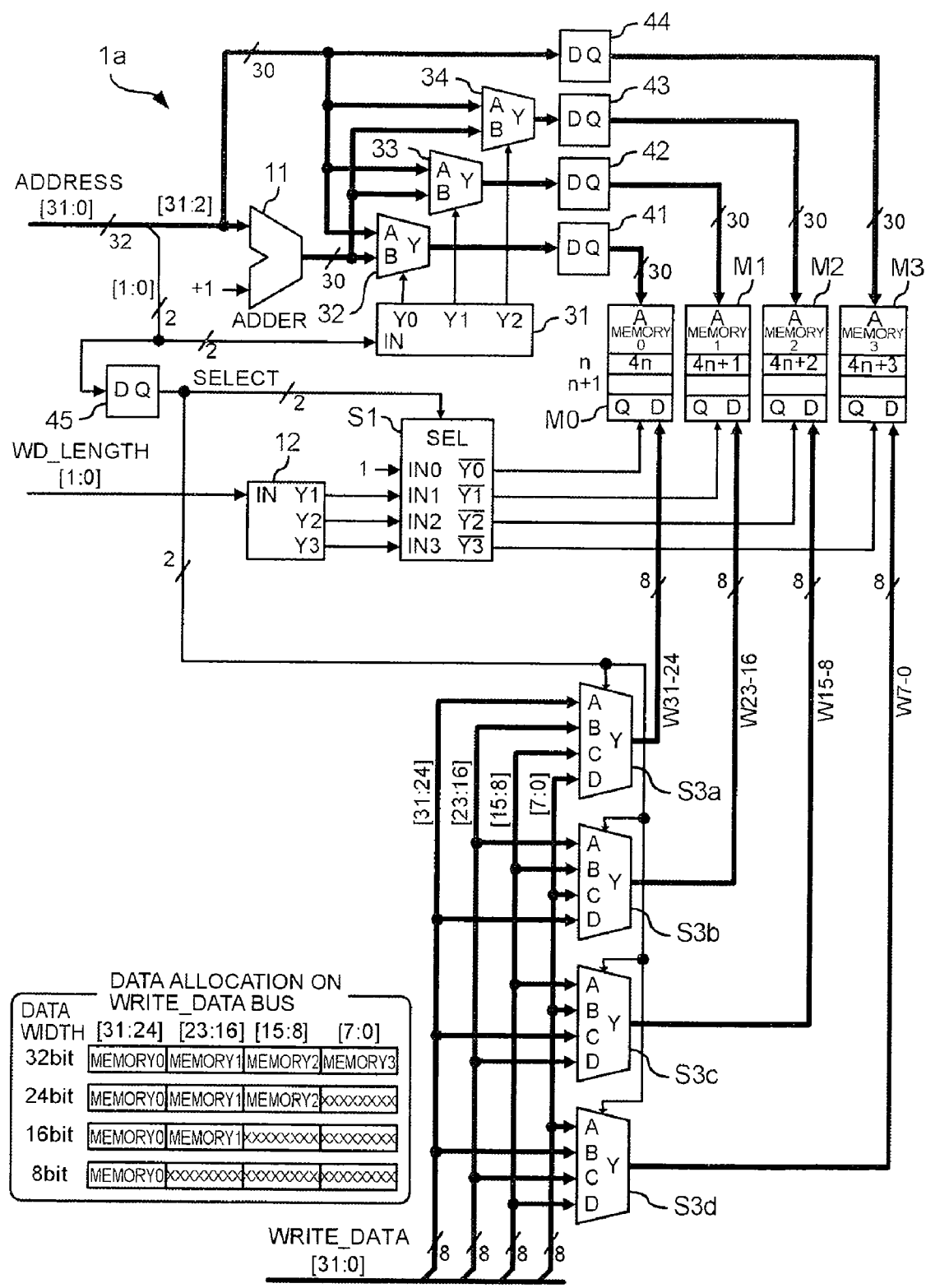
FIG. 17 depicts an example of data allocation when a head address of write data is No. 4n.

FIG. 17 depicts an example of data allocation when a head address of write data is No. 4n. If the head address of write data is No. 4n, the low-order two bits [1:0] of the 32-bit address are "0" (decimal number). Therefore, all the outputs Y0 to Y2 of the decoder 31 are "0", and the selectors 32 to 34 output the first specification address. That is, No. n is input to the address inputs A of the memories M0 to M3.

If the data width of the write data is 32 bits, WD_LENGTH is "3" (decimal number). In this case, all the outputs Y1 to Y3 of the decoder 12 are "1". Therefore, all the outputs /Y0 to /Y3 of the selector S1 are "0" and all the memories M0 to M3 become writable. The 32-bit write data are divided into 8-bit data from the highest order, input through the selectors S3a to S3d to the data inputs D in the order of the memories M0 to M3, and stored at No. n in each memory. These data stored in the memories M0 to M3 are data at Nos. 4n to 4n+3 in the entire address space of the memories M0 to M3.

If the data width of the write data is 24 bits, WD_LENGTH is "2" (decimal number). In this case, the outputs Y1 and Y2 are "1" and the output Y3 is "0" in the decoder 12. Therefore, since the outputs /Y0 to /Y2 are "0" and the output /Y3 is "1" in the selector S1, the memories M0 to M2 become writable and the memory M3 becomes unwritable. As a result, the high-order 24-bit data on the write data bus WRITE_DATA are divided into 8-bit data from the highest order, input through the selectors S3a to S3c to the data inputs D in the order of the memories M0 to M2, and stored at No. n in each memory.

If the data width of the write data is 16 bits, WD_LENGTH is "1" (decimal number). In this case, the output Y1 is "1" and the outputs Y2 and Y3 are "0" in the decoder 12. Therefore, since the outputs /Y0 and /Y1 are "0" and the output /Y2 and /Y3 are "1" in the selector S1, the memories M0 and M1 become writable and the memories M2 and M3 become unwritable. As a result, the high-order 16-bit data on the write data bus WRITE_DATA are divided into 8-bit data from the highest order, input through the selectors S3a and S3b to the data inputs D in the order of the memories M0 and M1, and stored at No. n in each memory.

If the data width of the write data is 8 bits, WD_LENGTH is "0" (decimal number). In this case, all the outputs Y1 to Y3 of the decoder 12 are "0". Therefore, since the output /Y0 is "0" and the outputs /Y1 to /Y3 are "1" in the selector S1, the memory M0 becomes writable and the memories M1 to M3 become unwritable. As a result, the high-order 8-bit data on the write data bus WRITE_DATA are input through the selector S3a to the data input D of the memory M0 and stored at No. n.

(6) WRITE (head address: No. 4n+1)

Figure 18:
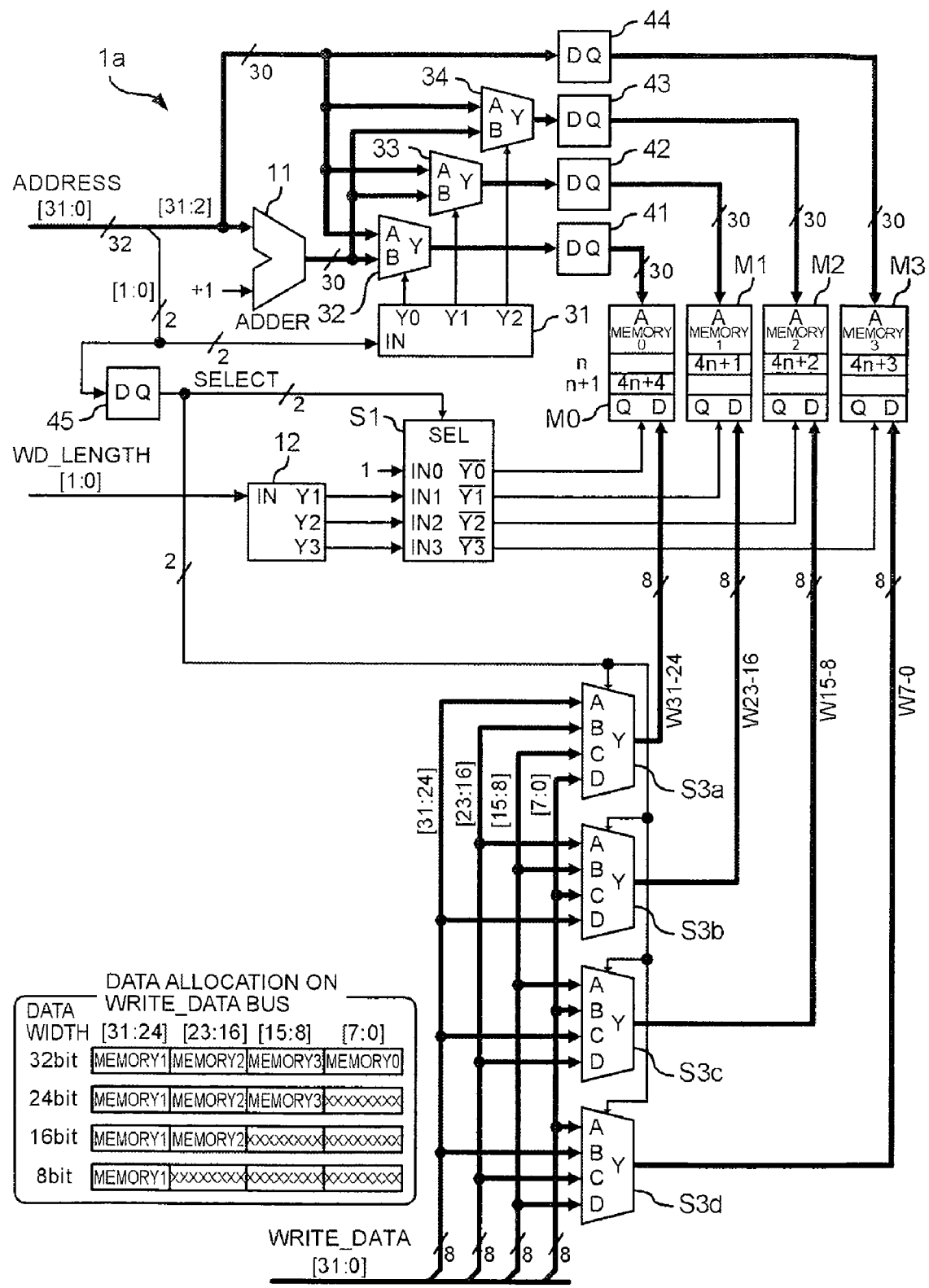
FIG. 18 depicts an example of data allocation when a head address of write data is No. 4n+1.

FIG. 18 depicts an example of data allocation when a head address of write data is No. 4n+1. If the head address of write data is No. 4n+1, the low-order two bits [1:0] of the 32-bit address are "1" (decimal number). Therefore, since the output Y0 is "1" and the outputs Y1 and Y2 are "0" in the decoder 31, the selectors 33, 34 output the first specification address and the selector 32 outputs the second specification address. That is, No. n is input to the address inputs A of the memories M1 to M3, and No. n+1 is input to the address input A of the memory M0.

If the data width of the write data is 32 bits, WD_LENGTH is "3" (decimal number). In this case, all the outputs Y1 to Y3 of the decoder 12 are "1". Therefore, all the outputs /Y0 to /Y3 of the selector S1 are "0" and all the memories M0 to M3 become writable. The 32-bit write data are divided into 8-bit data from the highest order, input through the selectors S3a to S3d to the data inputs D in the order of the memories M1 to M3 and M0, and stored at No. n in the memories M1 to M3 and at No. n+1 in the memory M0. These data stored in the memories M0 to M3 are data at Nos. 4n+1 to 4n+4 in the entire address space of the memories M0 to M3.

If the data width of the write data is 24 bits, WD_LENGTH is "2" (decimal number). In this case, the outputs Y1 and Y2 are "1" and the output Y3 is "0" in the decoder 12. Therefore, since the outputs /Y1 to /Y3 are "0" and the output /Y0 is "1" in the selector S1, the memories M1 to M3 become writable and the memory M0 becomes unwritable. As a result, the high-order 24-bit data on the write data bus WRITE_DATA are divided into 8-bit data from the highest order, input through the selectors S3b to S3d to the data inputs D in the order of the memories M1 to M3, and stored at No. n in each memory.

If the data width of the write data is 16 bits, WD_LENGTH is "1" (decimal number). In this case, the output Y1 is "1" and the outputs Y2 and Y3 are "0" in the decoder 12. Therefore, since the outputs /Y1 and /Y2 are "0" and the output /Y3 and /Y0 are "1" in the selector S1, the memories M1 and M2 become writable and the memories M3 and M0 become unwritable. As a result, the high-order 16-bit data on the write data bus WRITE_DATA are divided into 8-bit data from the highest order, input through the selectors S3b and S3c to the data inputs D in the order of the memories M1 and M2, and stored at No. n in each memory.

If the data width of the write data is 8 bits, WD_LENGTH is "0" (decimal number). In this case, all the outputs Y1 to Y3 of the decoder 12 are "0". Therefore, since the output /Y1 is "0" and the outputs /Y2, /Y3, and /Y0 are "1" in the selector S1, the memory M1 becomes writable and the memories M2, M3, and M0 become unwritable. As a result, the high-order 8-bit data on the write data bus WRITE_DATA are input through the selector S3b to the data input D of the memory M1 and stored at No. n.

(7) WRITE (head address: No. 4n+2)

Figure 19:
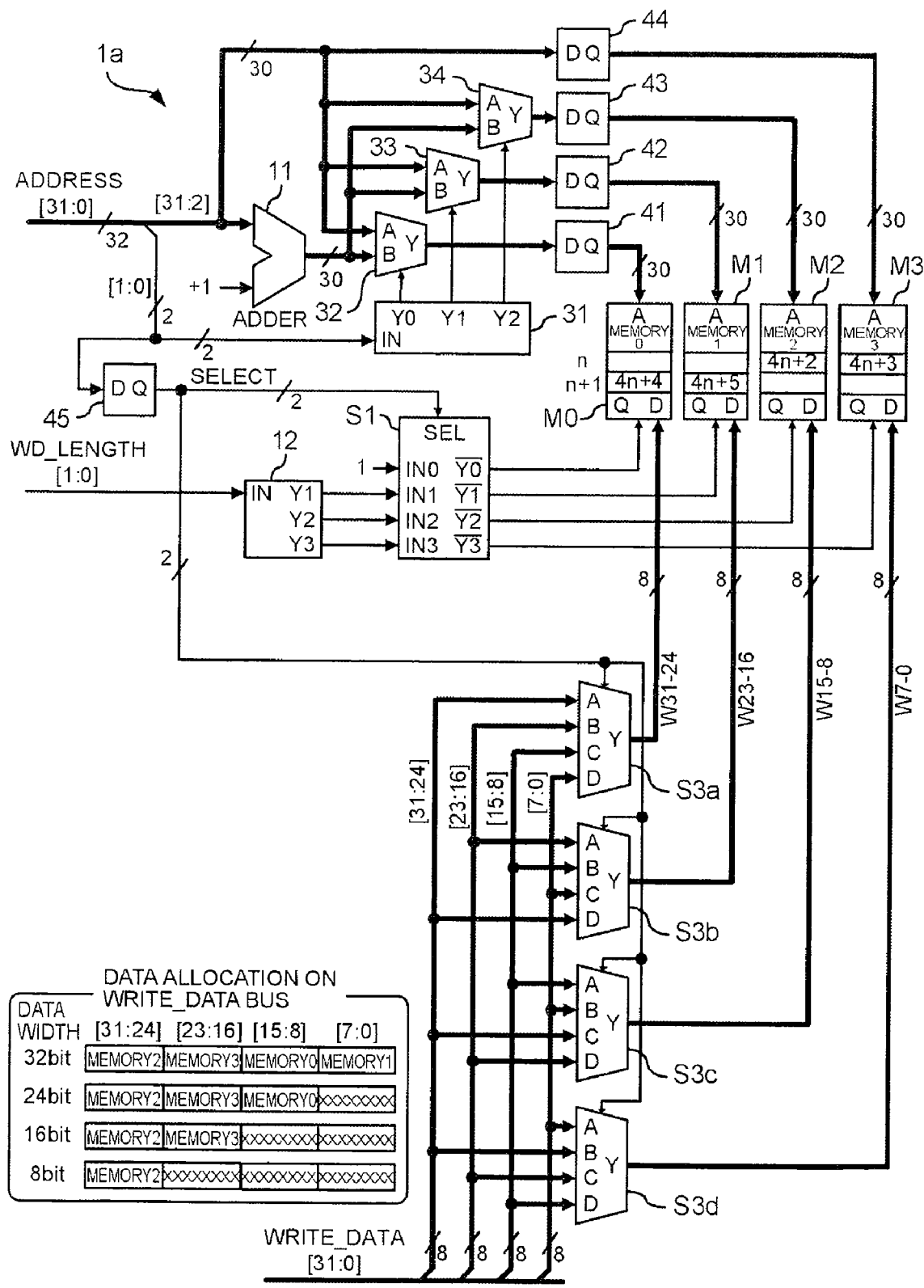
FIG. 19 depicts an example of data allocation when a head address of write data is No. 4n+2.

FIG. 19 depicts an example of data allocation when a head address of write data is No. 4n+2. If the head address of write data is No. 4n+2, the low-order two bits [1:0] of the 32-bit address are "2" (decimal number). Therefore, since the outputs Y0 and Y1 are "1" and the output Y2 is "0" in the decoder 31, the selector 34 outputs the first specification address and the selectors 32 and 33 output the second specification address. That is, No. n is input to the address inputs A of the memories M2 and M3, and No. n+1 is input to the address inputs A of the memories M0 and M1.

If the data width of the write data is 32 bits, WD_LENGTH is "3" (decimal number). In this case, all the outputs Y1 to Y3 of the decoder 12 are "1". Therefore, all the outputs /Y0 to /Y3 of the selector S1 are "0" and all the memories M0 to M3 become writable. The 32-bit write data are divided into 8-bit data from the highest order, input through the selectors S3a to S3d to the data inputs D in the order of the memories M2, M3, M0, and M1, and stored at No. n in the memories M2 and M3 and at No. n+1 in the memories M0 and M1. These data stored in the memories M0 to M3 are data at Nos. 4n+2 to 4n+5 in the entire address space of the memories M0 to M3.

If the data width of the write data is 24 bits, WD_LENGTH is "2" (decimal number). In this case, the outputs Y1 and Y2 are "1" and the output Y3 is "0" in the decoder 12. Therefore, since the outputs /Y2, /Y3, and /Y0 are "0" and the output /Y1 is "1" in the selector S1, the memories M2, M3, and M0 become writable and the memory M1 becomes unwritable. As a result, the high-order 24-bit data on the write data bus WRITE_DATA are divided into 8-bit data from the highest order, input through the selectors S3c, S3d, and S3a to the data inputs D in the order of the memories M2, M3, and M0, and stored at No. n in the memories M2 and M3 and at No. n+1 in the memory M0.

If the data width of the write data is 16 bits, WD_LENGTH is "1" (decimal number). In this case, the output Y1 is "1" and the outputs Y2 and Y3 are "0" in the decoder 12. Therefore, since the outputs /Y2 and /Y3 are "0" and the output /Y0 and /Y1 are "1" in the selector S1, the memories M2 and M3 become writable and the memories M0 and M1 become unwritable. As a result, the high-order 16-bit data on the write data bus WRITE_DATA are divided into 8-bit data from the highest order, input through the selectors S3c and S3d to the data inputs D in the order of the memories M2 and M3, and stored at No. n in each memory.

If the data width of the write data is 8 bits, WD_LENGTH is "0" (decimal number). In this case, all the outputs Y1 to Y3 of the decoder 12 are "0". Therefore, since the output /Y2 is "0" and the outputs /Y3, /Y0, and /Y1 are "1" in the selector S1, the memory M2 becomes writable and the memories M3, M0, and M1 become unwritable. As a result, the high-order 8-bit data on the write data bus WRITE_DATA are input through the selector S3c to the data input D of the memory M2 and stored at No. n.

(8) WRITE (head address: No. 4n+3)

Figure 20:
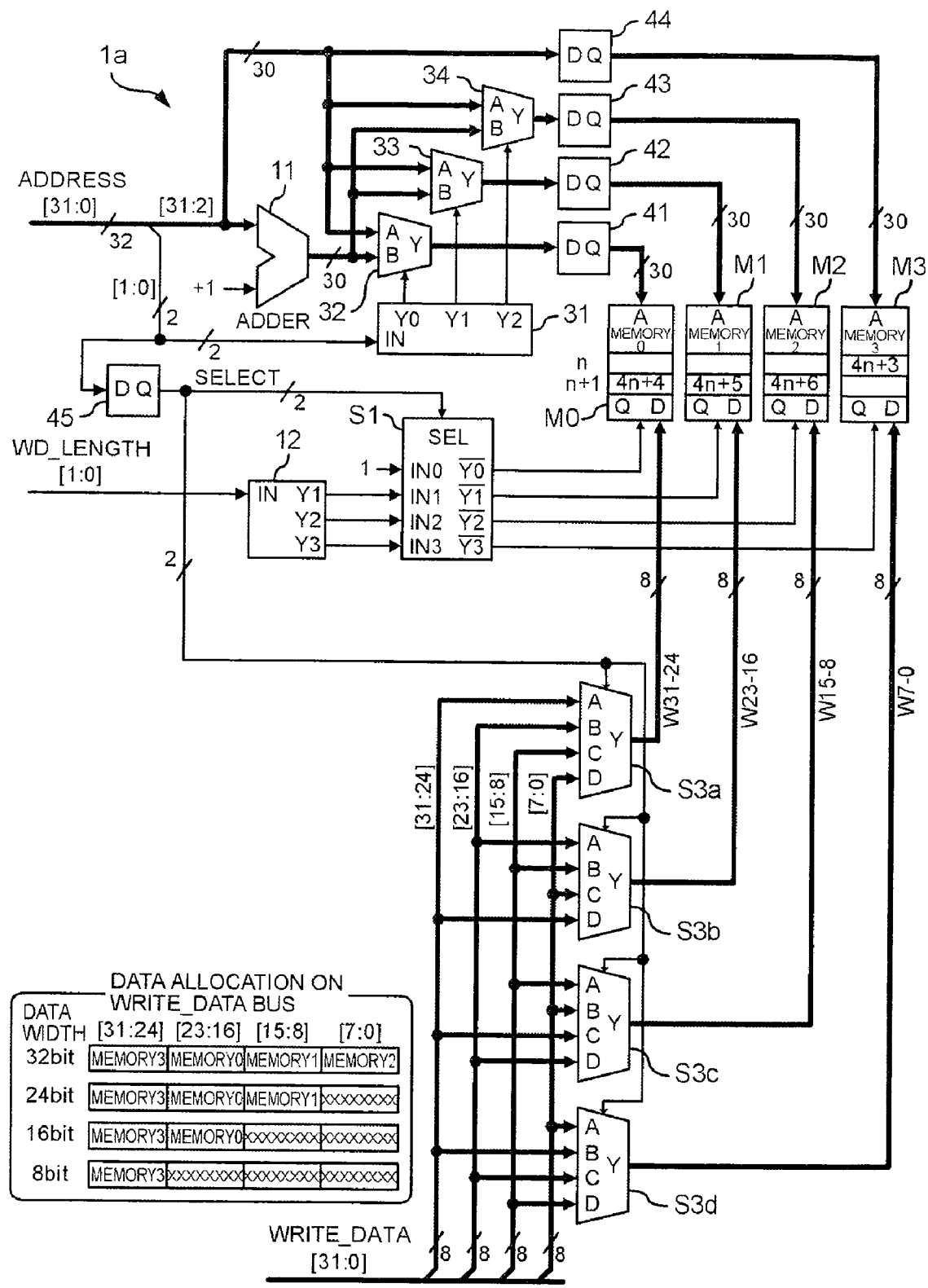
FIG. 20 depicts an example of data allocation when a head address of write data is No. 4n+3.
Figure 21:
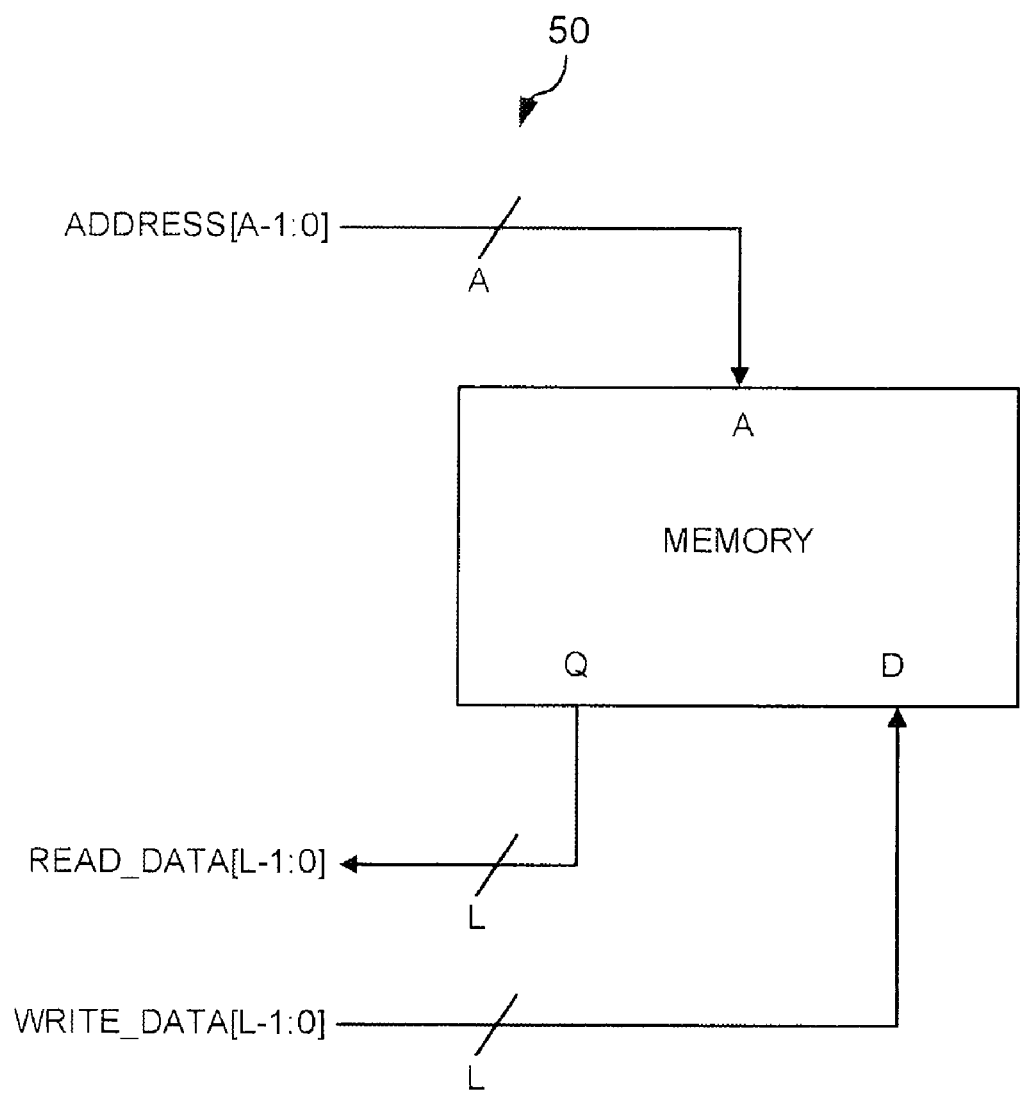
FIG. 21 depicts a configuration of a typical memory.
Figure 22:
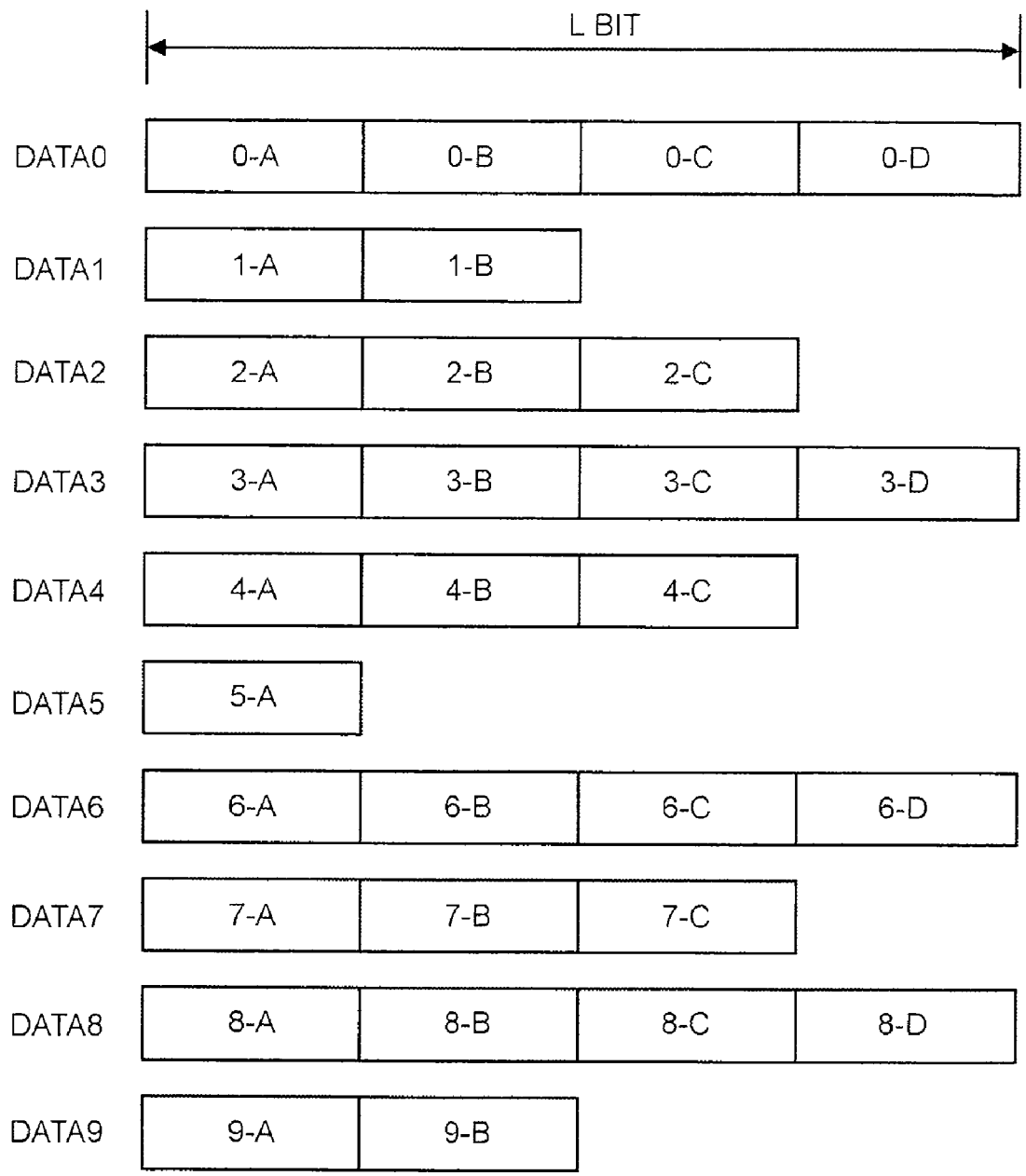
FIG. 22 depicts an example of various data with different data widths.
Figure 23:
FIG. 23 depicts a method of storing each piece of data into one address.

FIG. 20 depicts an example of data allocation when a head address of write data is No. 4n+3. If the head address of write data is No. 4n+3, the low-order two bits [1:0] of the 32-bit address are "3" (decimal number). Therefore, all the outputs Y0 to Y2 of the decoder 31 are "1", and the selectors 32 to 34 output the second specification address. That is, No. n is input to the address input A of the memory M3, and No. n+1 is input to the address inputs A of the memories M0 to M2.

If the data width of the write data is 32 bits, WD_LENGTH is "3" (decimal number). In this case, all the outputs Y1 to Y3 of the decoder 12 are "1". Therefore, all the outputs /Y0 to /Y3 of the selector S1 are "0" and all the memories M0 to M3 become writable. The 32-bit write data are divided into 8-bit data from the highest order, input through the selectors S3a to S3d to the data inputs D in the order of the memories M3 and M0 to M2, and stored at No. n in the memory M3 and at No. n+1 in the memories M0 to M2. These data stored in the memories M0 to M3 are data at Nos. 4n+3 to 4n+6 in the entire address space of the memories M0 to M3.

If the data width of the write data is 24 bits, WD_LENGTH is "2" (decimal number). In this case, the outputs Y1 and Y2 are "1" and the output Y3 is "0" in the decoder 12. Therefore, since the outputs /Y3, /Y0, and /Y1 are "0" and the output /Y2 is "1" in the selector S1, the memories M3, M0, and M1 become writable and the memory M2 becomes unwritable. As a result, the high-order 24-bit data on the write data bus WRITE_DATA are divided into 8-bit data from the highest order, input through the selectors S3d, S3a, and S3b to the data inputs D in the order of the memories M3, M0, and M1, and stored at No. n in the memory M3 and at No. n+1 in the memories M0 and M1.

If the data width of the write data is 16 bits, WD_LENGTH is "1" (decimal number). In this case, the output Y1 is "1" and the outputs Y2 and Y3 are "0" in the decoder 12. Therefore, since the outputs /Y3 and /Y0 are "0" and the output /Y1 and /Y2 are "1" in the selector S1, the memories M3 and M0 become writable and the memories M1 and M2 become unwritable. As a result, the high-order 16-bit data on the write data bus WRITE_DATA are divided into 8-bit data from the highest order, input through the selectors S3d and S3a to the data inputs D in the order of the memories M3 and M0, and stored at No. n in the memory M3 and at No. n+1 in the memory M0.

If the data width of the write data is 8 bits, WD_LENGTH is "0" (decimal number). In this case, all the outputs Y1 to Y3 of the decoder 12 are "0". Therefore, since the output /Y3 is "0" and the outputs /Y0 to /Y2 are "1" in the selector S1, the memory M3 becomes writable and the memories M0 to M2 become unwritable. As a result, the high-order 8-bit data on the write data bus WRITE_DATA are input through the selector S3d to the data input D of the memory M3 and stored at No. n.

The memory control circuit 1, 1a of the embodiment of the present invention has been described as above. The memory control circuit 1, 1a can store various data with different data widths without generating invalid data on a memory. That is, the various data with different data widths can be read and write without deteriorating the usage efficiency of the memory. Since processes of packing and unpacking data are not needed before writing data into the memory or after reading data from the memory, a processing load is not increased.

The above embodiment is for the purpose of facilitating the understanding of the present invention and does not limit the interpretation of the present invention. The present invention may be changed/altered without departing from the spirit thereof and the present invention includes the equivalents thereof.

Although a memory storing the beginning of data is selected by using the low-order j bits of the A-bit address in the embodiment, the present invention is not limited to the low-order j bits, and the high-order j bits or discontinuously selected j bits can be used.

What is claimed is:

1. A memory control circuit that controls m (=L/k) memories (first to mth memories), each of which has a k-bit width, the m memories storing data having a data width (D bits) of an integral multiple of k bits up to L bits, the circuit comprising:

an address input circuit that
determines a memory (nth memory) storing the first k bits of the data among the m memories, based on a start-position specification address which is a predetermined j bits of an A-bit address indicating a storage destination of the data, and
inputs to the nth to mth memories a first specification address for specifying a storage destination of the data, the first specification address being an A−j bits of the A-bit address, which is the A-bit address without the predetermined j bits thereof, and
inputs to the first to (n−1)th memories a second specification address obtained by adding one to the first specification address;
a data input circuit that inputs a plurality of pieces of divided data obtained by dividing the data into k-bit data to the memories respectively, in the order of the nth to mth memories and the first to (n−1)th memories, based on the start-position specification address;
a data output circuit that
reads the plurality of pieces of divided data from the memories respectively, in the order of the nth to mth memories and the first to (n−1)th memories, the number of the memories corresponding to the data width of the data, and
outputs the read plurality of pieces of divided data as the data,
based on the start-position specification address; and
a memory selecting circuit that makes the D/k memories readable/writable, in the order of the nth to mth memories and the first to (n−1)th memories, based on the start-position specification address and the data width of the data.

2. The memory control circuit of claim 1, wherein
the data output circuit includes:
an output data sorting circuit that sorts the plurality of pieces of divided data, each being the k-bit data, output from the m memories, in the order of the nth to mth memory and the first to (n−1)th memories, and outputs the sorted plurality of pieces of divided data, based on the start-position specification address; and
an output data selecting circuit that selects the divided data corresponding to the data width of the data from m pieces of the divided data output from the output data sorting circuit, and outputs the selected divided data.

3. The memory control circuit of claim 2, wherein
the output data selecting circuit includes:
m logical product circuits (first to mth logical circuits), to which each of the m pieces of the divided data output from the output data sorting circuit is input sequentially; and
a mask data input circuit that inputs one logical value for outputting the divided data to the second to (D/k)th logical product circuits, and inputs the other logical value for masking the divided data to be output to the (D/k+1)th to mth logical product circuits, based on the data width of the data.

4. The memory control circuit of claim 1, wherein
the start-position specification address is a low-order j bits of the A-bit address.

5. The memory control circuit of claim 2, wherein
the start-position specification address is a low-order j bits of the A-bit address.

6. The memory control circuit of claim 3, wherein
the start-position specification address is a low-order j bits of the A-bit address.

7. A memory control method of m (=L/k) memories (first to mth memories), each of which has a k-bit width, the m memories storing data having a data width (D bits) of an integral multiple of k bits up to L bits, the method comprising the steps of:

- determining a memory (nth memory) storing the first k bits of the data among the m memories, based on a start-position specification address which is a predetermined j bits of an A-bit address indicating a storage destination of the data;
- inputting to the nth to mth memories a first specification address for specifying a storage destination of the data, the first specification address being an A−j bits of the A-bit address, which is the A-bit address without the predetermined j bits thereof;
- inputting to the first to (n−1)th memories a second specification address obtained by adding one to the first specification address;
- inputting a plurality of pieces of divided data obtained by dividing the data into k-bit data to the memories respectively, in the order of the nth to mth memories and the first to (n−1)th memories, based on the start-position specification address, when writing the data;
- reading the plurality of pieces of divided data from the memories respectively, in the order of the nth to mth memories and the first to (n−1)th memories, the number of the memories corresponding to the data width of the data, and outputting the read plurality of pieces of divided data as the data, based on the start-position specification address, when reading the data; and
- making the D/k memories readable/writable, in the order of the nth to mth memories and the first to (n−1)th memories, based on the start-position specification address and the data width of the data.

* * * * *